US008567735B2

(12) United States Patent
Burgess et al.

(10) Patent No.: US 8,567,735 B2
(45) Date of Patent: Oct. 29, 2013

(54) WORK STATION WITH HEIGHT ADJUSTMENT LOCK

(75) Inventors: Roddy Burgess, Charlotte, NC (US); Jacob Connelly, Concord, NC (US); Robert McRorie, Huntersville, NC (US)

(73) Assignee: Rubbermaid Incorporated, Huntersville, NC (US)

( * ) Notice: Subject to any disclaimer, the term of this patent is extended or adjusted under 35 U.S.C. 154(b) by 20 days.

(21) Appl. No.: 13/016,367

(22) Filed: Jan. 28, 2011

(65) Prior Publication Data

US 2011/0233350 A1 Sep. 29, 2011

Related U.S. Application Data (60) Provisional application No. 61/299,655, filed on Jan. 29, 2010.

(51) Int. Cl.
*E04G 3/00* (2006.01)

(52) U.S. Cl.
USPC .............. 248/280.11; 248/285.1; 248/297.21; 248/331

(58) Field of Classification Search
USPC ........... 248/240, 276.1, 278.1, 280.11, 284.1, 248/285.1, 286.1, 317, 327, 331, 297.11, 248/297.21, 297.31; 312/223.3, 312, 327, 312/351.1; 108/50.01, 50.02, 147
See application file for complete search history.

(56) References Cited

U.S. PATENT DOCUMENTS

| 844,083 | A | * | 2/1907 | Barrella | 248/279.1 |
|---|---|---|---|---|---|
| 1,730,028 | A | | 10/1929 | Ball | |
| 2,077,337 | A | * | 4/1937 | Lifvendahl et al. | 248/240 |
| 3,089,742 | A | | 5/1963 | Powell | |
| 3,862,734 | A | | 1/1975 | Buchin et al. | |
| 3,999,733 | A | | 12/1976 | Harder, Jr. et al. | |
| 4,516,751 | A | * | 5/1985 | Westbrook | 248/279.1 |
| 4,544,121 | A | * | 10/1985 | Komura | 248/331 |
| 4,687,167 | A | * | 8/1987 | Skalka et al. | 248/126 |

(Continued)

FOREIGN PATENT DOCUMENTS

| DE | 3409990 A1 | 7/1984 |
|---|---|---|
| FR | 2783142 A1 | 3/2000 |
| GB | 2285911 A | 8/1995 |

OTHER PUBLICATIONS

United States Patent and Trademark Office, Office Action, U.S. Appl. No. 12/636,181, Oct. 21, 2011.

(Continued)

*Primary Examiner* — Gwendolyn Baxter
(74) *Attorney, Agent, or Firm* — Dennis J. Williamson; Moore & Van Allen PLLC (57) ABSTRACT

A workstation comprises a support and a carriage mounted on the support and movable relative to the support. The carriage supports a work platform. A counter-balance supports the carriage and the work platform. A lock mechanism locks the carriage relative to the support in a desired position. The workstation may comprise a swing arm attached to the support at a vertical pivot such that the support may pivot relative to the swing arm. A method of operating the work station is also provided comprising moving an actuator to retract the pin from the rack. The weight of the support is supported by the counter-balance. The carriage is repositioned and the actuator is released to allow the pin to move to the extended position where it engages the rack.

16 Claims, 7 Drawing Sheets

(56) References Cited

U.S. PATENT DOCUMENTS

| | | |
|---|---|---|
| 4,836,478 A | 6/1989 | Sweere |
| 4,907,773 A | 3/1990 | Menchetti et al. |
| 5,007,608 A * | 4/1991 | Carroll, Jr. ............... 248/297.21 |
| 5,240,215 A | 8/1993 | Moore |
| 5,487,525 A | 1/1996 | Drabczyk et al. |
| 5,630,566 A | 5/1997 | Case |
| 5,632,462 A | 5/1997 | Kallas |
| D380,736 S | 7/1997 | Theis et al. |
| 5,738,316 A | 4/1998 | Sweere et al. |
| 5,743,503 A | 4/1998 | Voeller et al. |
| 5,791,623 A | 8/1998 | Louridas |
| 5,797,568 A | 8/1998 | Canton Gongora et al. |
| 5,842,672 A | 12/1998 | Sweere et al. |
| 5,876,008 A | 3/1999 | Sweere et al. |
| D412,161 S | 7/1999 | Theis et al. |
| 5,918,841 A | 7/1999 | Sweere et al. |
| 5,924,665 A | 7/1999 | Sweere et al. |
| D413,110 S | 8/1999 | Sweere et al. |
| 5,944,896 A | 8/1999 | Landesman et al. |
| 5,947,429 A | 9/1999 | Sweere et al. |
| 5,967,479 A | 10/1999 | Sweere et al. |
| 5,992,809 A | 11/1999 | Sweere et al. |
| 6,012,693 A | 1/2000 | Voeller et al. |
| 6,015,120 A | 1/2000 | Sweere et al. |
| 6,019,332 A | 2/2000 | Sweere et al. |
| D423,745 S | 4/2000 | Theis et al. |
| D431,736 S | 10/2000 | O'Brien et al. |
| 6,189,849 B1 | 2/2001 | Sweere et al. |
| 6,233,791 B1 | 5/2001 | Theis |
| D450,903 S | 11/2001 | Wacker et al. |
| 6,354,549 B2 | 3/2002 | Sweere et al. |
| D455,916 S | 4/2002 | Fluhrer et al. |
| 6,367,756 B1 | 4/2002 | Wang |
| 6,380,484 B1 | 4/2002 | Theis et al. |
| 6,409,134 B1 | 6/2002 | Oddsen, Jr. |
| 6,419,196 B1 | 7/2002 | Sweere et al. |
| 6,581,887 B2 | 6/2003 | Lapidez |
| D477,325 S | 7/2003 | Theis et al. |
| D477,606 S | 7/2003 | Theis et al. |
| 6,709,058 B1 | 3/2004 | Diffrient |
| 6,712,008 B1 | 3/2004 | Habenicht et al. |
| 6,783,105 B2 * | 8/2004 | Oddsen, Jr. ............... 248/279.1 |
| 6,863,252 B2 | 3/2005 | Bosson |
| 6,883,764 B1 | 4/2005 | Mileos et al. |
| 6,959,965 B2 | 11/2005 | Diffrient |
| 6,994,306 B1 | 2/2006 | Sweere et al. |
| 6,997,422 B2 | 2/2006 | Sweere et al. |
| 7,032,870 B2 | 4/2006 | Sweere et al. |
| 7,048,242 B2 * | 5/2006 | Oddsen, Jr. ............... 248/280.11 |
| 7,063,296 B2 * | 6/2006 | Williams ............... 248/285.1 |
| 7,066,435 B2 | 6/2006 | Oddsen, Jr. et al. |
| 7,147,190 B2 | 12/2006 | Welles et al. |
| 7,152,488 B2 | 12/2006 | Hedrich et al. |
| D535,432 S | 1/2007 | Diffrient |
| D537,323 S | 2/2007 | Saez |
| 7,195,213 B2 | 3/2007 | Weatherly |
| 7,252,277 B2 | 8/2007 | Sweere et al. |
| 7,303,173 B2 | 12/2007 | Mileos |
| D584,908 S | 1/2009 | Diffrient |
| 7,472,458 B2 | 1/2009 | Oddsen |
| 7,475,946 B2 | 1/2009 | Diffrient |
| 7,481,170 B2 | 1/2009 | Sommerfield |
| 7,487,940 B2 | 2/2009 | Saez et al. |
| 7,954,780 B2 | 6/2011 | Dittmer |
| 2003/0001057 A1 | 1/2003 | Sweere et al. |
| 2003/0057340 A1 | 3/2003 | Mann et al. |
| 2005/0062370 A1 | 3/2005 | Miller |
| 2007/0259554 A1 | 11/2007 | Lindblad et al. |
| 2007/0295870 A1 | 12/2007 | Peterson et al. |
| 2008/0026892 A1 | 1/2008 | Asamarai et al. |
| 2008/0142660 A1 | 6/2008 | Goldberg et al. |
| 2008/0168930 A1 | 7/2008 | Calero |
| 2008/0258029 A1 | 10/2008 | Zhang |
| 2009/0212184 A1 | 8/2009 | Bourgeois et al. |

OTHER PUBLICATIONS

United States Patent and Trademark Office, Office Action, U.S. Appl. No. 12/636,181, Feb. 29, 2012.

* cited by examiner

WORK STATION WITH HEIGHT ADJUSTMENT LOCK

This application claims benefit of priority under 35 U.S.C. §119(e) to the filing date of to U.S. Provisional Application No. 61/299,655, as filed on Jan. 29, 2010, which is incorporated herein by reference in its entirety.

BACKGROUND

The invention relates to work stations for supporting display monitors and user input devices such as keyboards on a wall or other vertical surface. The work stations are typically mounted to a wall and comprise a movable support that is moved by the end user to position the display, keyboard or the like. Existing competitor workstations use a counter-balance mechanism to maintain the support in the desired position. The counter-balance mechanism may comprise a gas spring with an adjustment screw that changes the application angle of the counter-balance force and/or length of a mechanism member to vary the force exerted by the counter-balance mechanism on the support. The vertical position may be maintained by the counter-balance device and friction joints. The counter-balance force is adjusted to match the weight of the support and the devices mounted to the support, primarily a keyboard and monitor. Any additional force applied by the end user can cause the mechanism to move unexpectedly such that the height adjustment capability only works for a limited load range beyond the counter-balance setting. In addition, adjustment of the counter-balance mechanism is difficult and typically requires hand tools and may require some disassembly of the work station. These factors result in workstations that do not remain in a fixed position during use, tend to float downward with applied loads, and are difficult to adjust.

SUMMARY OF THE INVENTION

A workstation comprises a support and a carriage that is mounted on the support and is movable relative to the support between a plurality of vertical positions where the carriage supports a work platform. The carriage may also support a monitor. The work platform may support a keyboard tray. A counter-balance mechanism supports the carriage and the work platform. A lock mechanism locks the carriage relative to the support in a desired vertical position. The workstation may comprise a swing arm attached to the support at a vertical pivot such that the support may pivot relative to the swing arm. The arm may be attached to a mounting structure at a second vertical pivot. The mounting structure may be adapted to be attached to a wall or other vertical support. The counter-balance may be connected between the carriage and the support. The counter-balance may exert a force sufficient to hold the carriage in position when the lock mechanism is disengaged. The counter-balance may comprise a piston cylinder such as a gas cylinder. The lock mechanism may comprise a vertical rack that extends along the support. The lock mechanism may further comprise a pin mounted on the carriage such that the pin moves between a retracted position where it is disengaged from the rack and an extended position where the pin engages the rack. The pin may be biased to the extended position. The pin may be moved to the retracted position by an actuator. The actuator may comprise a cable or a knob. The actuator may be connected to the pin by a linkage and is accessible by the end user.

A method of operating a work station comprises providing a support; a carriage mounted on the support and movable relative to the support where the carriage supports a work platform; a counter-balance for supporting the carriage and the work platform; and a lock mechanism for locking the carriage relative to the support comprising a pin engageable with a rack. An actuator is moved to retract the pin from the rack. The weight of the support is supported by a counter-balance. The movable support is repositioned to the desired height. The actuator is released to allow the pin to move to the extended position where it engages the rack to lock the carriage at the desired height. The work platform may be used as a desk.

DETAILED DESCRIPTION OF EMBODIMENTS OF THE INVENTION

The workstation described herein uses a height adjustment mechanism comprising a lock device to fix the vertical position of a movable carriage of the workstation. The height adjustment lock device prevents the workstation from inadvertently moving vertically during normal use. The lock device is controlled by the end user, enabling the workstation to be easily adjusted when desired. Fast and easy workstation height adjustment facilitates proper ergonomics for a broad range of end user heights. The work station has particular application in medical environments such as hospitals or the like.

Figure 1:
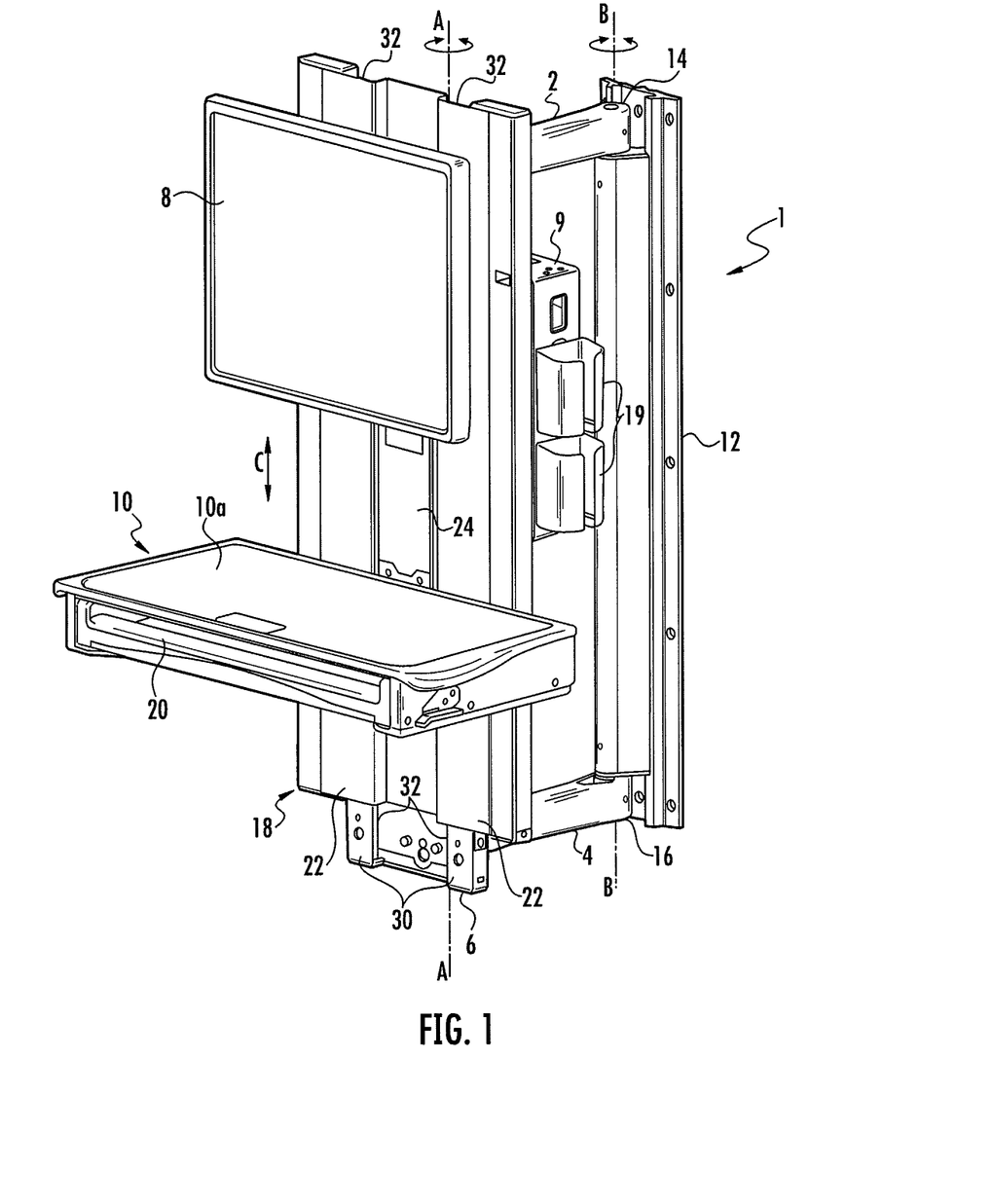
FIG. 1 is a perspective view showing an embodiment of the work station in a raised position.
Figure 2:
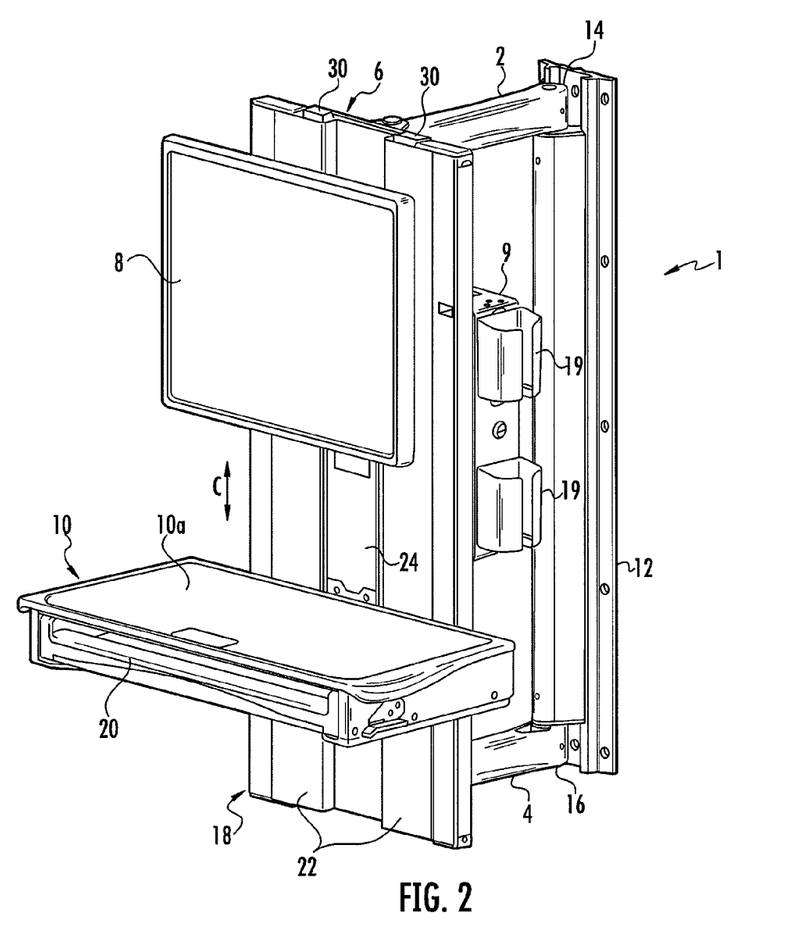
FIG. 2 is a perspective view of the work station of FIG. 1 in a lowered position.
Figure 3:
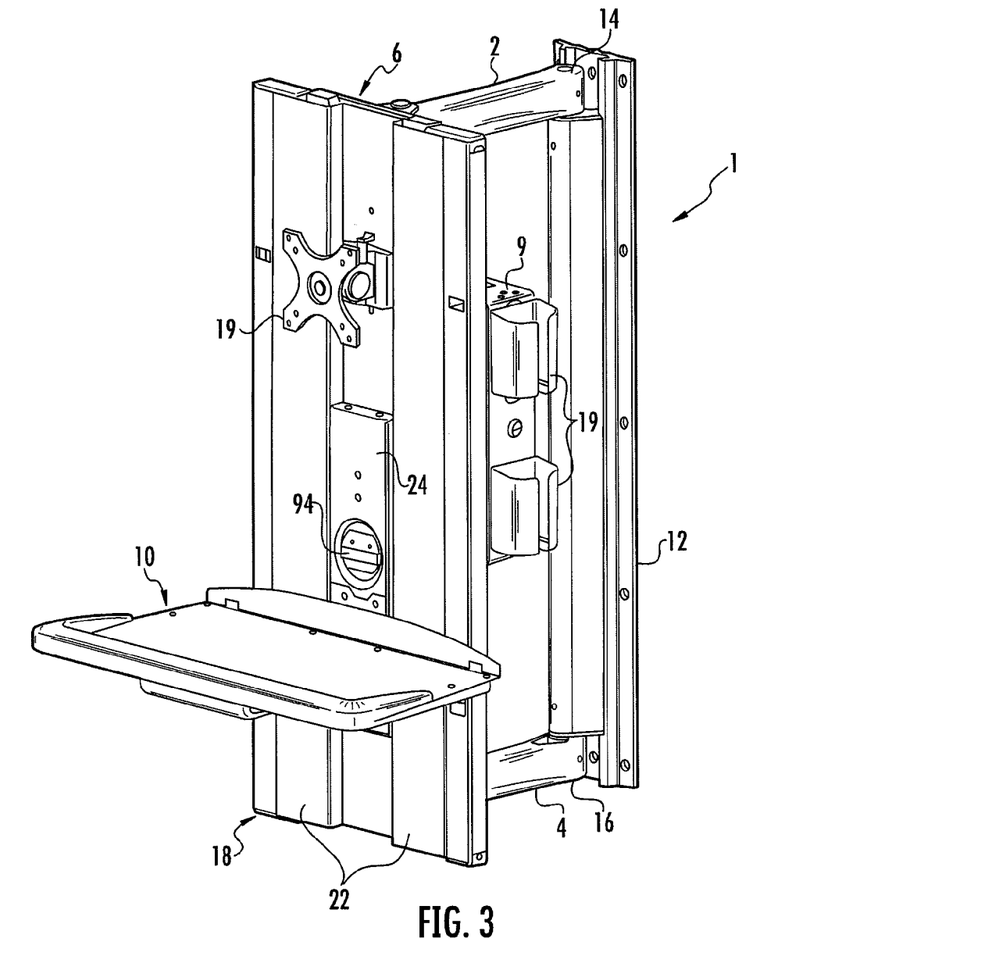
FIG. 3 is a perspective view showing a second embodiment of the work station with the monitor removed.

Referring to FIGS. 1 through 3, the work station is shown generally at 1 and uses a dual swing arm comprising a first upper swing arm 2 and a second lower swing arm 4 attached to a support 6 at vertical pivots such that the support 6 may pivot relative to arms 2 and 4 about vertical axis A-A. A movable carriage 18 is mounted on support 6 for vertical movement relative to support 6. Carriage 18 supports equipment such as a monitor 8 and work platform 10. The arms 2 and 4 are also attached to a mounting structure 12 at vertical pivots 14 and 16 such that the arms 2 and 4 may pivot relative to the mounting structure 12 about axis B-B. In the illustrated embodiment the mounting structure 12 is a reinforced post, bracket or plate that is adapted to be attached to a wall or other fixed vertical support by screws or other fasteners. While the illustrated work station is a wall mounted work station, the height adjustment mechanism may be used with a mobile workstation such as a cart based work station where the support 6 is mounted on or forms a part of a rolling cart.

The dual swing arm arrangement provides vertical and side-to-side motion and improves cable management, stowing, stability, ease of service/maintenance and installation. The wall work station 1 is particularly well suited for healthcare applications such as in a patient room although it may be used in a wide variety of applications. In such a healthcare environment maintaining the range of movement is important for user comfort and healthcare professional-to-patient interaction.

Carriage 18 supports work platform 10 and equipment such as a monitor 8, keyboard, mouse or the like. A computer, router or other electrical equipment may be supported in computer cabinet 9 mounted to the carriage 18. The work platform 10 may support a keyboard tray 20 that supports a keyboard and mouse. The keyboard tray 20, keyboard, mouse or other user interface device may be supported by the work platform 10 in an internal compartment. The keyboard tray 20 may slide and/or pivot into and out of the work platform 10 such that the keyboard tray and keyboard may be exposed when in use but hidden when not in use and for storage. Providing a substantially horizontal work surface 10a on the work platform 10 allows the work surface 10a to be used as a support for papers, medication and other equipment while simultaneously allowing the user to access the keyboard. The work platform 10 may be mounted to carriage 18 on a horizontal pivot axis such that it can be rotated from the illustrated horizontal position to a vertical storage position where it is located below the monitor 8. Further, the monitor 8 may be mounted on the movable carriage 18 on a support 19 (FIG. 3) that can may be adjustable vertically and may be rotated relative to the movable carriage about the x, y and/or z axes to change the viewing angle of the monitor. In the embodiment of FIG. 3 the work platform 10 comprises an open keyboard tray rather than the enclosed desk-type configuration of FIG. 1.

The height adjustment lock mechanism fixes the position of the movable carriage 18 relative to support 6 to provide a more stable and usable platform for the end user. In addition, the end user can easily unlock and reposition the movable carriage 18 to adjust the height of the workstation. The height adjustment mechanism is hidden behind panels 22 and 24 to safely isolate the components from the user and to provide an aesthetically pleasing design.

Figure 4:
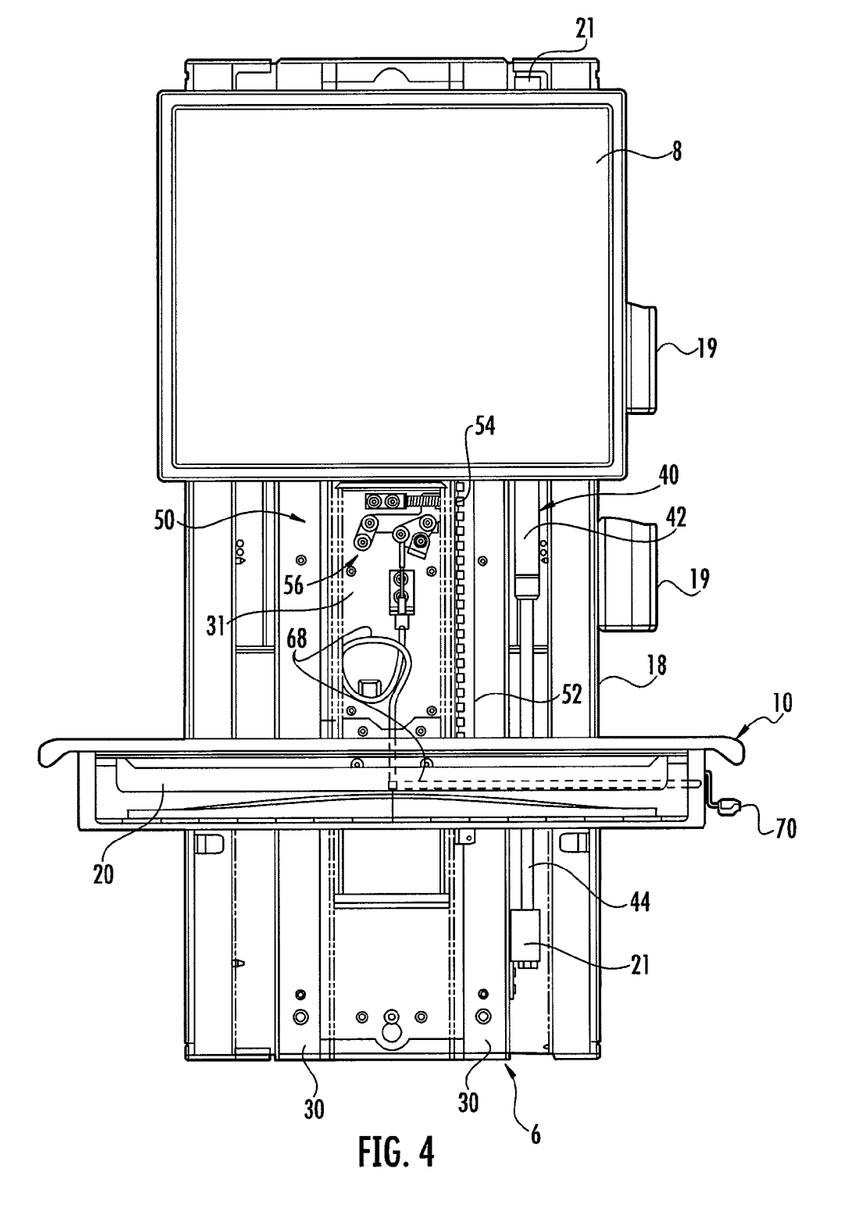
FIG. 4 is a front view of the work station of FIG. 1 with the panels removed to show the height adjustment mechanism.
Figure 5:
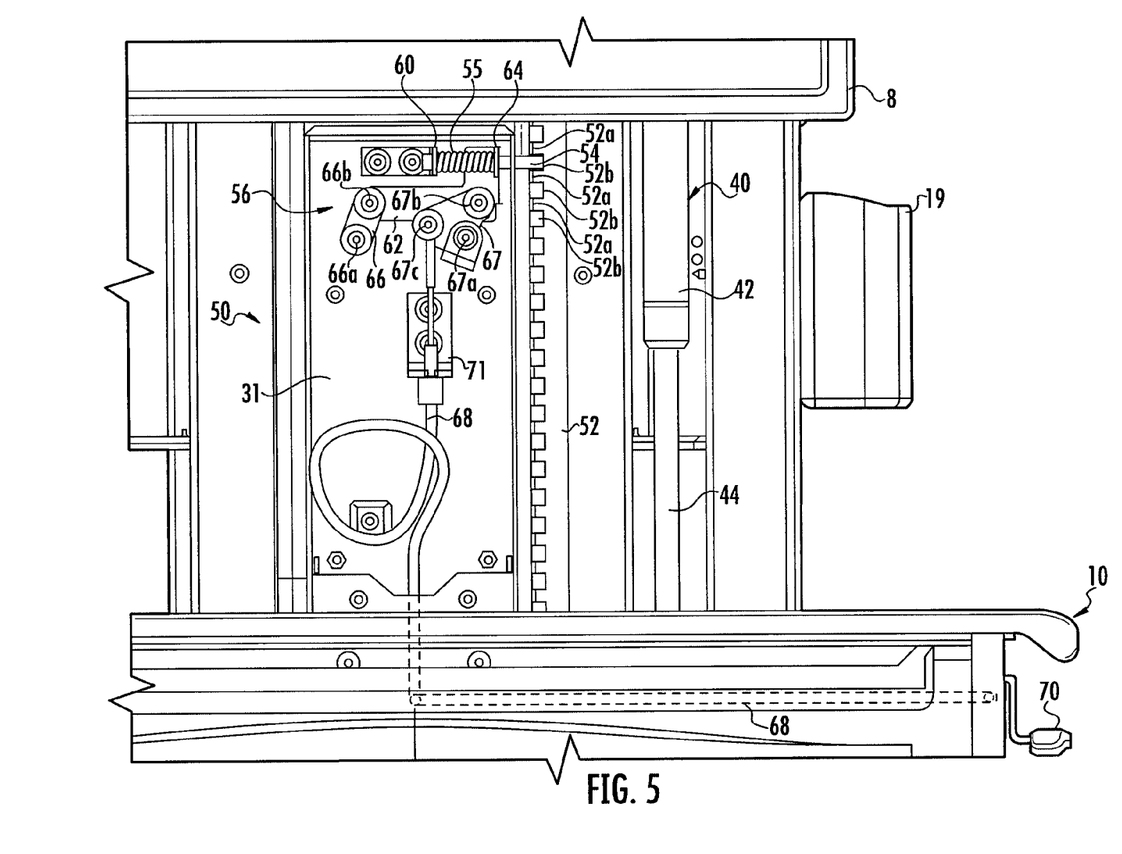
FIG. 5 is a front view similar to FIG. 4 showing an embodiment of the height adjustment mechanism in greater detail.
Figure 6:
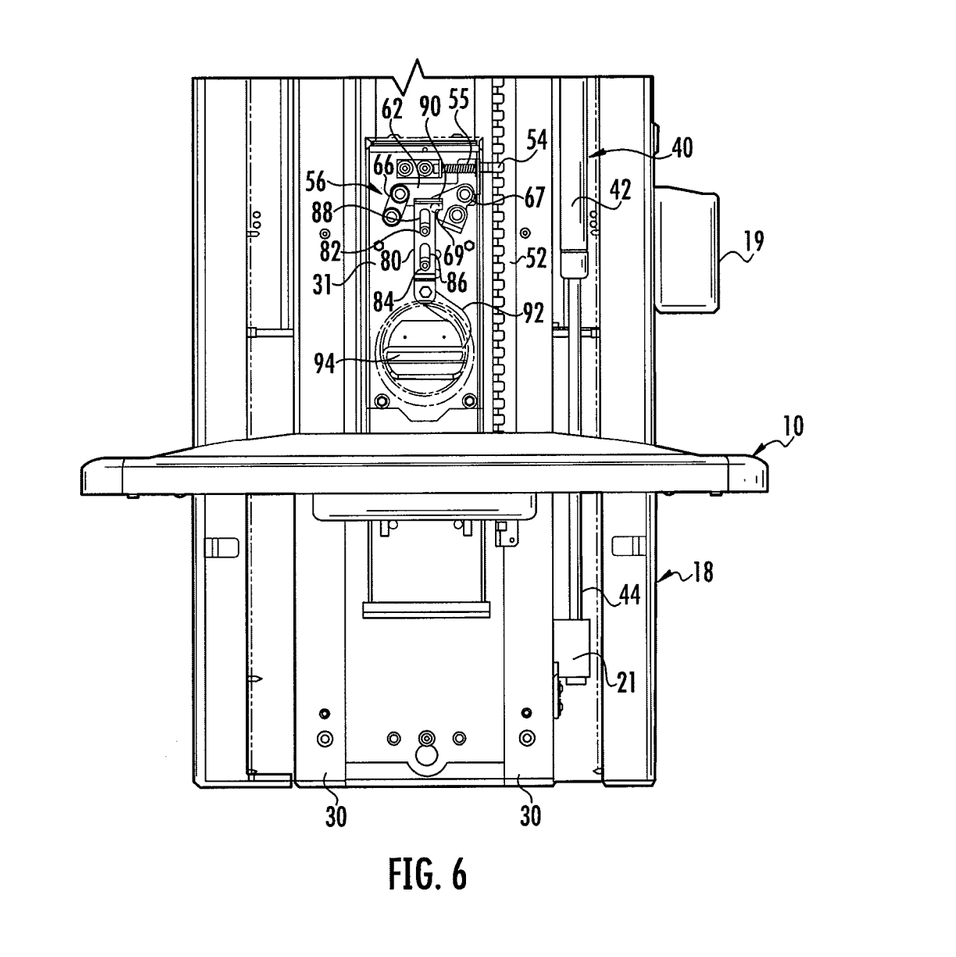
FIG. 6 is a front view of the work station of FIG. 3 with the panels removed to show the height adjustment mechanism.

Support 6 comprises cabinet slides 30 for receiving the movable carriage 18 where the carriage 18 is free to move vertically on slides 30 relative to the support 6 such that the height of the movable carriage 18 is variable and can be adjusted by the end user. The slides 30 define vertically extending channels 32 (FIG. 1) that are engaged by the edges of movable slide plate 31 that forms part of carriage 18 (FIGS. 4, 5 and 6). The engagement of the slide plate 31 with the vertically extending channels 32 constrains the movement of the carriage 18 to vertical movement along the height of the support 6 in the direction of arrow C. The movable carriage 18 supports the monitor 8 and work station 10 and/or other user equipment such that movement of the carriage 18 results in corresponding vertical movement of the monitor 8 and work station 10 and any other equipment mounted on carriage 18. Other storage devices 19 may also be supported by support 6 for holding other end user equipment.

A counter-balance 40 such as a piston cylinder may be connected between the movable carriage 18 and the support 6 to act as a counterbalance to the weight of the movable carriage 18 and the supported equipment to temporarily hold the movable carriage and the equipment supported by the movable carriage in position when the lock mechanism is disengaged. The counter-balance 40 may comprise a cylinder 42 and piston 44 connected between the movable carriage 18 and the support 6, such as at connectors 21, where the cylinder 42 is able to temporarily support the weight of the movable carriage 18 and the equipment supported by the movable carriage. The cylinder 42 may comprise a gas, hydraulic or pneumatic cylinder. Further, the counter-balance 40 may comprise a device other than a cylinder such as a spring biased or weighted pulley system.

Referring to FIGS. 4 and 5, the lock mechanism 50 comprises a vertical rack 52 comprising a series of teeth 52a that define a series of recesses 52b that extends along at least a portion of the height of support 6. The rack 52 may comprise a series of apertures or other similar structure suitable for receiving a pin rather than the teeth and recesses. In one embodiment the rack 52 is located along at least a portion of the length of one of the channels 32. A pin 54 is mounted on the movable carriage 18 such that the pin 54 is moved vertically up and down with the movable carriage 18 adjacent to the rack 52. The pin 54 moves horizontally between a retracted position where it is disengaged from the rack 52 and an extended position where the pin 54 engages the rack 52. The pin 54 is normally biased to the extended position by a spring or other biasing mechanism 55. The engagement of the pin 54 with the rack 52 locks the movable carriage 18 in the desired vertical position relative to the support 6.

In one embodiment an actuator such as a cable 68 is connected to the pin 54 via a linkage 56 such that manipulation of the cable 68 actuates the linkage 56 to move the pin 54 to the retracted position and withdraw the pin 54 from engagement with the rack 52. Once the pin 54 is withdrawn from the rack 52 the movable carriage 18 may be vertically moved relative to support 6 and the height of the movable carriage 18 and the equipment it supports can be adjusted. The counter-balance 40 facilitates movement of the movable carriage 18 by supporting the carriage 18 and other equipment such that the user does not have to lift the weight of the movable carriage 18 and the supported equipment when adjusting the height of the movable carriage 18; however, the counter-balance 40 is not relied on to hold the movable carriage 18 in the desired position during use of the work station because the movable carriage 18 is supported by the engagement of pin 54 with rack 52. When the user releases the cable 68 the spring 55 biases the pin 54 to the extended position and back into engagement with the rack 52 to again lock the carriage 18 in position.

In one embodiment, the pin 54 is supported in a guide 60 where the guide constrains the pin 54 to horizontal movement toward and away from rack 52 between the extended and retracted positions. A slide member 62 is fixed to the pin 54 at a midpoint thereof such that movement of the slide member 62 results in movement of the pin 54. In one embodiment a retainer 64 is fixed to the pin 54 such that the slide member 62 abuts the retainer such that movement of the slide member 62 is transmitted to the pin 54 through the retainer 64. The spring 55 may comprise a compression spring such as a helical spring mounted on pin 54 and trapped between the guide 60 and the retainer 64 such that when the pin 54 is retracted (moved to the left as viewed in the figures) the spring 55 is compressed between the retainer 64 and the guide 60 such that the spring 55 will bias the pin 54 to the extended position absent any counteracting force.

A pair of links 66, 67 are pivotally mounted at one end 66a and 67a, respectively, to the carriage 18 and at the opposite end 66b and 67b, respectively, to the slide member 62 such that rotation of the links (counter-clockwise as viewed in the figures) causes the slide member 62 to move away from rack 52 to retract the pin 54 from rack 52 and compress the spring 55. To rotate the links 66, 67 an actuator in the form of cable 68 and control lever 70 is provided. One end of cable 68 is connected to one of the links 66, 67 at a point where a pulling force exerted on the cable 68 will rotate the links counter-clockwise. In the illustrated embodiment link 67 has a triangular configuration where one point of the triangle is pivotably connected to the slide member 62 at pivot point 67b, the second point of the triangle is pivotably connected to the movable support 18 at pivot point 67a and the third point of the link is connected to the cable 68 at point 67c. When the cable 68 is pulled, link 67 is pivoted about pivot 67a to rotate the link 67 and move slide member 62 and pin 54 away from the rack 52.

The cable 68 extends from the linkage 56 down the movable carriage 18 and into the work station 10. The cable extends through the work station 10 to a point where it is accessible by the user. In the illustrated embodiment the cable 68 extends to a point external of the work station 10 where it is connected to a rotary lever 70. Rotation of lever 70 exerts a pulling force on the cable 68 that is transmitted to the linkage 56 to withdraw the pin 54 from the rack 52. When lever 70 is released spring 55 returns the pin 54 to the extended position where it reengages rack 52. Suitable guides 71 may be used to guide the cable 68 from the linkage 56 to the lever 70. The cable 68 may terminate, and the lever 70 may be located at, a location other than the side of the work station 10. Panels 22 and 24 may be attached to the movable carriage 18 to cover the lock mechanism 50 and counter-balance device 40 as shown in FIG. 1.

Referring to FIGS. 3 and 6 an alternate embodiment the actuator is shown where like reference numerals are used to identify components previously described with reference to FIGS. 1 and 2. In the embodiment of FIGS. 3 and 6 the actuator comprises a rotary knob 94 that may be rotated to actuate the linkage 56 to withdraw the pin 54 from the rack 52. The linkage 56 is constructed and operates in the same manner as the linkage 56 described with reference to FIGS. 4 and 5 except that point 67c of link 67 comprises a post 69 that is operatively connected to slide actuator 80 rather than to cable 68. Slide actuator 80 comprises a link mounted for vertical movement on pins 82, 84. Specifically, pins 82, 84 are vertically aligned and engage vertically oriented slots 86, 88 on actuator 80 such that the actuator 80 is free to move vertically. One end of actuator 80 terminates in a flange 90 that is disposed over and engages post 69 of link 67. The opposite end of the actuator 80 is pivotably connected to one end of a link arm 92. The opposite end of link arm 92 is pivotably connected to rotary knob 94. Knob 94 is mounted on movable carriage 18 for rotational movement where it can be accessed and rotated by the end user. Rotation of knob 94 pulls down on link arm 92 causing link arm 92 to pull the slide actuator 80 downward. Downward motion of actuator 80 is transmitted to link 67 via the engagement of flange 90 with post 69 causing link 67 to rotate counter-clockwise to pull slide member 62 away from rack 52 and to disengage the pin 54 from the rack 52. When knob 94 is released spring 55 returns the pin 54 to the extended position. Panels 22 and 24 may be attached to the movable platform and to the support 6 to cover the lock mechanism and counter-balance device as previously described except that knob 94 extends through the panel 24.

Both lock mechanisms shown above operate within a space of less than 16.25 mm. The actuators of both designs retract the lock mechanism, enabling the end user to easily adjust the vertical position of the workstation. Releasing the actuators allow the locking mechanism to reengage to lock the carriage 18 to the support 6. Various components could be replaced by alternate components. For example, non-structural members could be replaced by molded plastic components. The height adjustment lock prevents the workstation from moving vertically unless the end user intentionally unlocks the mechanism. The workstation can support substantial applied loads, allowing additional features such as the optional writing surface 10a or the technology cabinet 9 for computer equipment.

Figure 7:
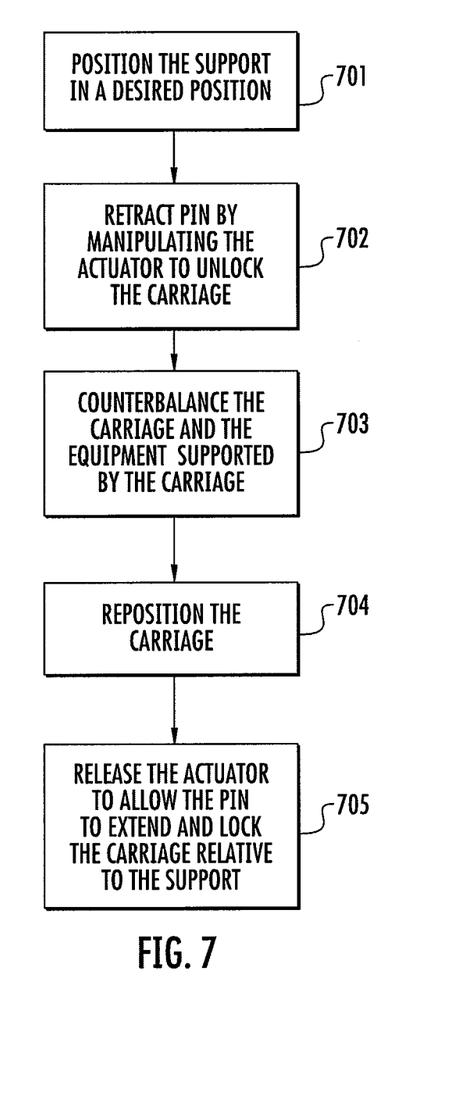
FIG. 7 is a block diagram illustrating an embodiment of the operation of the work station.

Operation of the work station will be described with reference to FIG. 7. The user may rotate the swing arms 2 and 4 relative to the mounting structure 12 and the support 6 relative to the swing arms to position the support in a desired position (block 701). To adjust the height of the workstation, the user manipulates the actuator, knob 94 and link 80 or lever 70 and cable 68, to retract the pin 54 from the rack 52 and unlock the carriage 18 from the support 6 (block 702). The weight of the movable carriage 18 and the equipment supported by carriage 18 is counterbalanced by counter-balance 40 (block 703) such that the user can easily reposition the movable carriage 18 to a desired height (block 704). Once the movable carriage 18 is properly positioned, the user releases the actuator allowing the spring 55 to move the pin 54 to the extended position where it engages the rack 52 to lock the movable carriage 18 relative to support 6 in the desired position (block 705). In this position, because the carriage is supported by the engagement of the pin with the rack and not just by the counter-balance mechanism, the user may apply more force to the work surfaces without the work station inadvertently moving positions. This allows the user to use the work platform as a support for equipment or paperwork and allows the user to use the work surface as a desk. To reposition the carriage 18 the process of unlocking the locking mechanism, repositioning the carriage, and locking the lock mechanism can be easily repeated by the end user without the use of any tools.

Specific embodiments of an invention are disclosed herein. One of ordinary skill in the art will recognize that the invention has other applications in other environments. Many embodiments are possible. The following claims are in no way intended to limit the scope of the invention to the specific embodiments described above.

The invention claimed is:

1. A method of operating a work station comprising:
providing a work station comprising:
a support; a carriage mounted on the support and movable relative to the support, the carriage supporting a work platform; a counter-balance for supporting the carriage and the work platform;
a lock mechanism for locking the carriage relative to the support in the first position and the second position, the lock mechanism comprising a pin engagable with a rack;
moving an actuator to retract the pin from the rack;
supporting the weight of the carriage using a counter-balance when the pin is disengaged from the rack;
repositioning the carriage to a desired height;
releasing the actuator allowing the pin to move to the extended position where it engages the rack to lock the carriage at the desired height.

2. The method of claim 1 further comprising using the work platform as a desk.

3. A workstation comprising:
a support;
a carriage mounted on the support and movable relative to the support between a plurality of positions, the carriage supporting a work platform;
a lock mechanism for locking the carriage relative to the support in one of the plurality of positions wherein the lock mechanism comprises a vertical rack and a pin movable between a retracted position where the pin is disengaged from the rack and an extended position where the pin engages the rack;
a counter-balance supporting the carriage and the work platform when the pin is in the retracted position;

a swing arm attached to the support at a vertical pivot such that the support may pivot relative to the swing arm and attached to a mounting structure at a second vertical pivot, wherein the mounting structure is adapted to be attached to a vertical support.

4. The workstation of claim 3 wherein the carriage supports a monitor.

5. The workstation of claim 3 wherein the counter-balance is connected between the carriage and the support.

6. The workstation of claim 3 wherein the counter-balance comprises a cylinder.

7. The workstation of claim 6 wherein the cylinder comprises a gas cylinder.

8. The workstation of claim 3 wherein the pin is biased to the extended position.

9. The workstation of claim 3 wherein the pin is moved to the retracted position by an actuator.

10. The workstation of claim 9 wherein the actuator comprises a cable.

11. The workstation of claim 9 wherein the actuator comprises a knob.

12. The workstation of claim 9 wherein the actuator is connected to the pin by a linkage.

13. The workstation of claim 9 wherein the actuator is accessible to the user.

14. A workstation comprising:
a support;
a carriage mounted on the support and movable relative to the support between a plurality of positions, the carriage supporting a work platform;
a lock mechanism for locking the carriage relative to the support in one of the plurality of positions wherein the lock mechanism comprises a vertical rack and a pin movable between a retracted position where the pin is disengaged from the rack and an extended position where the pin engages the rack, the pin being biased to the extended position and being moved to the retracted position by an actuator comprising a cable;
a counter-balance for supporting the carriage and the work platform when the pin is in the retracted position.

15. The workstation of claim 14 comprising a swing arm attached to the support at a vertical pivot such that the support may pivot relative to the swing arm.

16. The workstation of claim 15 wherein the swing arm is attached to a mounting structure at a second vertical pivot.

* * * * *